United States Patent
Park et al.

(10) Patent No.: US 8,941,558 B2
(45) Date of Patent: Jan. 27, 2015

(54) STEREOSCOPIC IMAGE DISPLAY DEVICE AND DRIVING METHOD FOR THE SAME

(75) Inventors: Sang-Hun Park, Gyeongbuk (KR); Jong-Hyuck Lee, Gumi-si (KR); Hee-Sung Woo, Daegu (KR)

(73) Assignee: LG Display Co., Ltd., Seoul (KR)

( * ) Notice: Subject to any disclaimer, the term of this patent is extended or adjusted under 35 U.S.C. 154(b) by 204 days.

(21) Appl. No.: 13/593,675

(22) Filed: Aug. 24, 2012

(65) Prior Publication Data

US 2013/0076724 A1    Mar. 28, 2013

(30) Foreign Application Priority Data

Sep. 22, 2011  (KR) .................. 10-2011-0095615
May 31, 2012   (KR) .................. 10-2012-0058680

(51) Int. Cl.
  *G09G 5/00*   (2006.01)
  *G09G 3/20*   (2006.01)
  *G02B 27/22*  (2006.01)
  (Continued)

(52) U.S. Cl.
  CPC .............. *G09G 3/20* (2013.01); *G02B 27/2264* (2013.01); *H04N 13/0409* (2013.01); *H04N 13/0468* (2013.01); *G09G 3/003* (2013.01); *G09G 2300/023* (2013.01)
  USPC .................................. 345/6; 359/462; 348/51

(58) Field of Classification Search
  CPC ............ G09G 3/00; G09G 3/20; G09G 3/36; G02B 27/22; G02B 27/2264; H04N 13/0409; H04N 13/0468
  USPC .................. 345/4, 6, 87, 204; 348/52, 51, 56; 359/462, 464, 466
  See application file for complete search history.

(56) References Cited

U.S. PATENT DOCUMENTS

| | | |
|---|---|---|
| 2007/0046777 A1 | 3/2007 | Song et al. |
| 2007/0229654 A1 | 10/2007 | Kusuno |
| 2010/0060983 A1 | 3/2010 | Wu et al. |

(Continued)

FOREIGN PATENT DOCUMENTS

| | | |
|---|---|---|
| CN | 102006491 A | 4/2011 |
| EP | 1703743 A1 | 9/2006 |

(Continued)

OTHER PUBLICATIONS

Combined Search and Examination Report issued by the United Kingdom Patent Office in Patent Application No. 1214615.5 issued Jan. 31, 2013.

(Continued)

*Primary Examiner* — Regina Liang
(74) *Attorney, Agent, or Firm* — Morgan, Lewis & Bockius LLP

(57) ABSTRACT

The present invention is about a stereoscopic image display device and a driving method for the same, the stereoscopic image display device comprising: a display panel configured to display an image; a switchable panel located on the display panel and having a plurality of switchable regions, the switchable panel being configured to convert the image into a 3D image; a voltage applying unit configured to apply voltage to the switchable panel in such a way as to divide each switchable region into a barrier region and a transmitting region; and a controller configured to control the voltage applying unit in such a way as to adjust a position of the barrier region and a width of the barrier region within the switchable region.

15 Claims, 9 Drawing Sheets

(51) Int. Cl.
*H04N 13/04* (2006.01)
*G09G 3/00* (2006.01)

(56) References Cited

U.S. PATENT DOCUMENTS

2011/0051239 A1   3/2011   Daiku
2011/0157171 A1   6/2011   Lin
2012/0188230 A1   7/2012   Li et al.

FOREIGN PATENT DOCUMENTS

| JP | H10-174127 A | 6/1998 |
|---|---|---|
| JP | 2007-072217 A | 3/2007 |
| JP | 2007-163709 A | 6/2007 |
| KR | 1020060096844 A | 9/2006 |
| TW | 201122645 A | 7/2011 |
| TW | 201227671 A | 7/2012 |
| TW | 201232107 A | 8/2012 |

OTHER PUBLICATIONS

Partial translation of KR 10-2006-0096844, p. 4, lines 38, to p. 7, line 31, and Claims 1-2, 13 and 17.

Office Action issued in counterpart Japanese Patent Application No. 2012-205752 dated Sep. 3, 2013.

Office Action dated Feb. 27, 2014 from Korean Patent Office in counterpart Korean application No. 10-2012-008680.

Office Action issued in counterpart Taiwanese Patent Application No. 101131891 dated Jul. 9, 2014.

Office Action issued in counterpart Chinese Patent Application No. 201210239707.9 dated May 28, 2014.

STEREOSCOPIC IMAGE DISPLAY DEVICE AND DRIVING METHOD FOR THE SAME

This application claims the benefit of the Korean Patent Application No. P 10-2011-0095615, filed on Sep. 22, 2011 and Korean Patent Application No. P 10-2012-0058680, filed on May 31, 2012, both of which are hereby incorporated by reference as if fully set forth herein.

BACKGROUND OF THE INVENTION

1. Field of the Invention

The present invention relates to a stereoscopic image display device, and more particularly, to a stereoscopic image display device and a driving method for the same, which can minimize flicker when a viewer is changing position.

2. Discussion of the Related Art

At present, services for rapid dissemination of information, to be constructed based on high-speed information communication networks, have developed from a simple "listening and speaking" service, such as current telephones, to a "watching and listening" multimedia type service based on digital terminals used for high-speed processing of characters, voices and images, and are expected to be ultimately developed into hyperspace 3-dimensional stereoscopic information communication services enabling virtual reality and stereoscopic viewing free from the restrains of time and space.

In general, stereoscopic images representing a 3-Dimension (3D) are realized based on the principle of stereo-vision via the viewer's eyes. However, since the viewer's eyes are spaced apart from each other by about 65 mm, i.e. have a binocular parallax, the left and right eyes perceive slightly different images due to a positional difference between the two eyes. Such an image difference due to the positional difference between the two eyes is called binocular disparity.

A 3-dimensional stereoscopic image display device is designed based on binocular disparity to allow the left eye to view only an image for the left eye and the right eye to view only an image for the right eye, thereby assisting a viewer in viewing a 3D image by realizing binocular disparity. Specifically, the left and right eyes view different 2-dimensional images, respectively. If the two different images are transmitted to the brain through the retina, the brain accurately combines the images, reproducing depth perception and realism of an original 3D image. This ability is conventionally referred to as stereography (stereoscopy), and a display device to which stereoscopy is applied is referred to as a stereoscopic display device.

Meanwhile, stereoscopic display devices may be classified based on methods and characteristics in relation to realization of a 3D image into glasses-type stereoscopic display devices and non-glasses type stereoscopic display devices. Non-glasses type stereoscopic display devices may be classified based on the shape of a structure realizing a 3D image into switchable panel type devices and lenticular type devices. Switchable panel type devices are configured to realize a 3D image in such a way that a 3D panel converting a 2D image into a 3D image is provided on a display panel emitting a 2D image. Lenticular type devices realize a 3D image using a semicylindrical lenticular sheet attached to a display panel.

The switchable panel type devices, in which a switchable panel converting a 2D image into a 3D image is provided on a display panel emitting a 2D image to ensure realization of a 3D image, may be classified into switchable barrier type devices and switchable liquid crystal lens type devices.

In particular, in the case of switchable barrier type devices, voltage is selectively applied to a plurality of electrodes of a switchable panel so that a liquid crystal layer is divided into a barrier region and a transmitting region based on alignment of liquid crystal molecules. As the barrier region functions to optically separate left and right images, the viewer can view a 3D image.

Such a switchable barrier type stereoscopic image display device generally includes a display panel that emits a 2D image, and a switchable panel that is formed on the display panel and emits a 3D image upon receiving the 2D image from the display panel.

However, since the switchable barrier type stereoscopic image display device includes a barrier formed at a fixed position, if a position of the viewer is moved with respect to the switchable barrier type stereoscopic image display device due to, e.g., rotation of the device and deviates from a standard viewing position, the viewer cannot view a 3D image.

SUMMARY OF THE INVENTION

Accordingly, the present invention is directed to a stereoscopic image display device and a driving method for the same that substantially obviate one or more problems due to limitations and disadvantages of the related art.

An object of the present invention is to provide a stereoscopic image display device and a driving method for the same in which a barrier region is moved via adjustment of an open ratio of a transmitting region within one switchable region, thereby minimizing flicker perceived by a viewer who is changing position.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device comprising: a display panel configured to display an image; a switchable panel located on the display panel and having a plurality of switchable regions, the switchable panel being configured to convert the image into a 3D image; a voltage applying unit configured to apply voltage to the switchable panel in such a way as to divide each switchable region into a barrier region and a transmitting region; and a controller configured to control the voltage applying unit in such a way as to adjust a position of the barrier region and a width of the barrier region within each switchable region.

The controller controls the voltage applying unit to change the voltage applied to the switchable panel so as to decrease a width of the barrier region within one switchable region in case that a viewer is changing position.

Herein, a ratio of the transmitting region to the one switchable region may be increased to the maximum extent within a range in which 3D crosstalk is 1% or less.

Further, the switchable panel may include first and second substrates arranged to face each other with a liquid crystal layer interposed therebetween, a plurality of lower electrodes formed on the first substrate, and an upper electrode formed on the entire surface of the second substrate.

In case that the viewer has not changed position for more than a period of critical time, the ratio of the transmitting region to each switchable region may be reduced. In this case, the ratio of the transmitting region to each switchable region may be reduced to make the ratio be equal to the original ratio before the viewer changes position.

In accordance with another aspect of the invention, a method for driving a stereoscopic image display device including the above, comprising: tracking a position of a viewer who is viewing the stereoscopic image display device; changing a width of the barrier region within the switchable region in case that the viewer is changing position; and reducing a ratio of the transmitting region to each switchable region in case that the viewer has not changed position for more than a period of critical time.

Herein, the step of reducing the ratio of the transmitting region to each switchable region is processed to make the ratio be equal to the original ratio before the viewer changes position The barrier region of the switchable region has a first width when the viewer is stationary, and has a second width shorter than the first width in case that the viewer is changing position.

Furthermore, the step of changing the width of the barrier region includes: a first step of detecting position change of the viewer; a second step of changing the width of the barrier region as the second width; and a third step of shifting the barrier region to correspond to the position change of the viewer.

The first step may include detection by using user tracking.

The second step and the third step may include adjusting barrier region forming voltage and transmitting region forming voltage to be applied from the voltage applying unit to the lower electrodes of each switchable region.

The second step may include increasing the number of the transmitting region forming voltage applied to the lower electrodes leftward and rightward, so that the number of the transmitting region forming voltage applied to the lower electrodes corresponds to the change of the barrier region from the first width to the second width.

Further, the third step may include shifting the barrier region having the second width according to the movement of the viewer, by adjusting the barrier region forming voltage to be applied to the lower electrodes.

Furthermore, the step of reducing the ratio of the transmitting region to each switchable region further comprises detecting that the viewer has not changed position for more than a period of critical time by the user tracking.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Hereinafter, a stereoscopic image display device according to the present invention will be described in detail with reference to the accompanying drawings.

Figure 1:
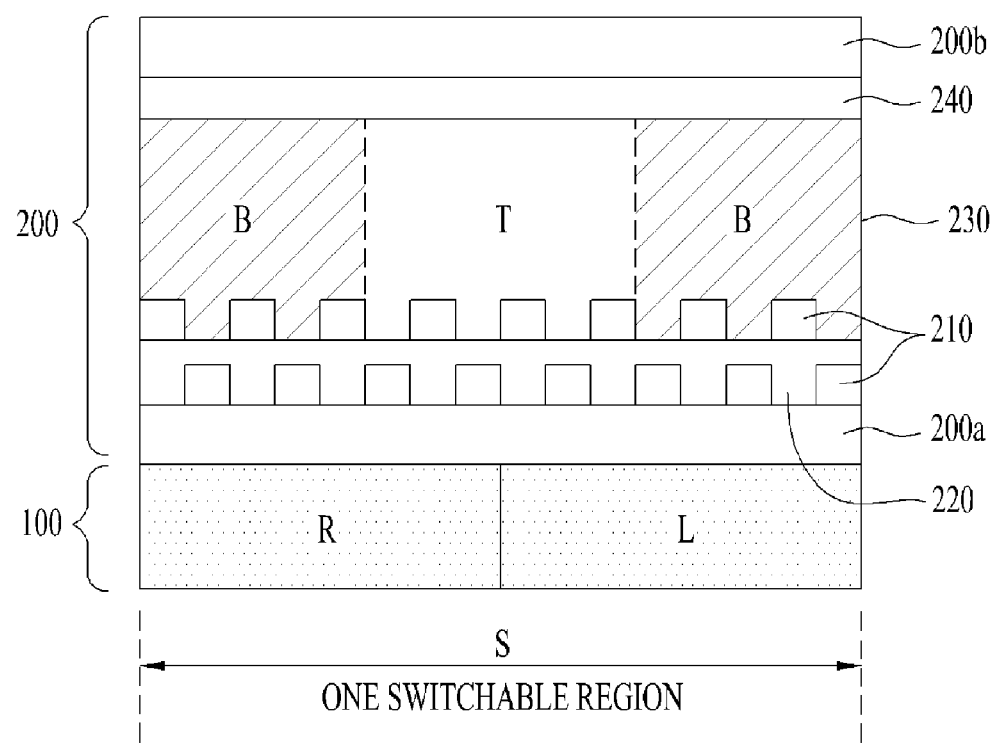
FIG. 1 is a sectional view illustrating a stereoscopic image display device according to the present invention.
Figure 2:
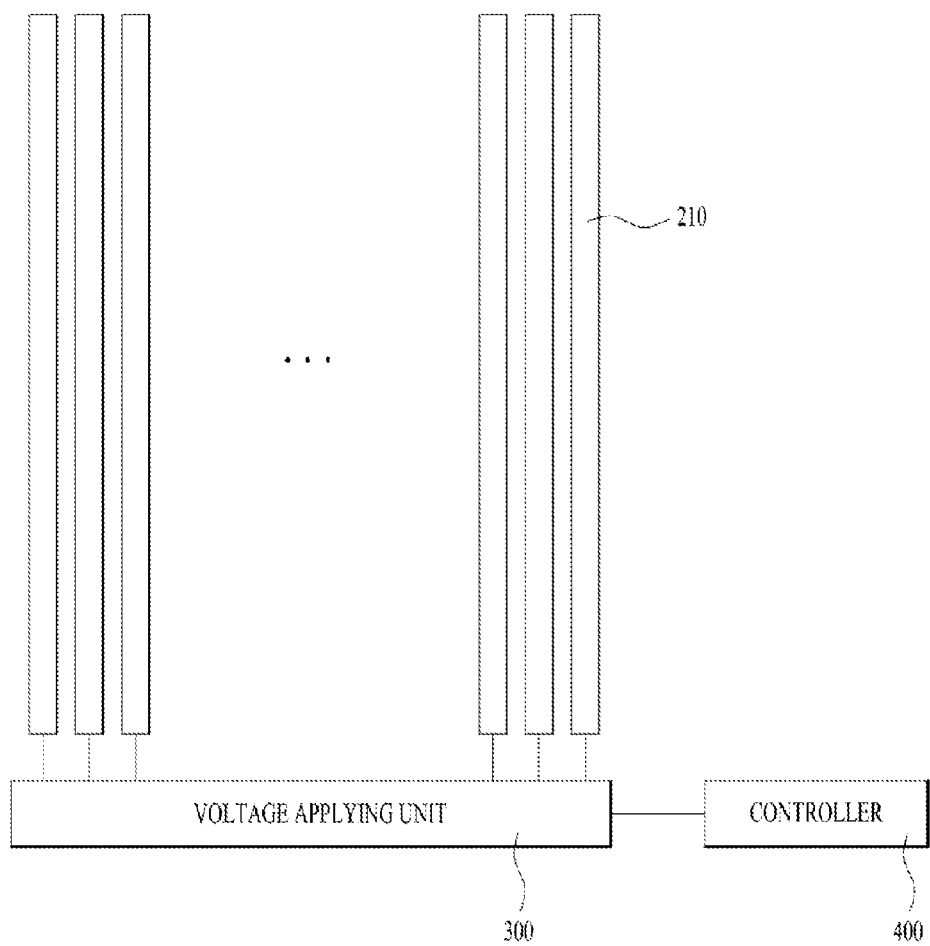
FIG. 2 is a schematic view illustrating a method of applying voltage to lower electrodes of FIG. 1.

FIG. 1 is a sectional view illustrating a stereoscopic image display device according to the present invention, and FIG. 2 is a schematic view illustrating a method of applying voltage to lower electrodes of FIG. 1.

Figure 5:
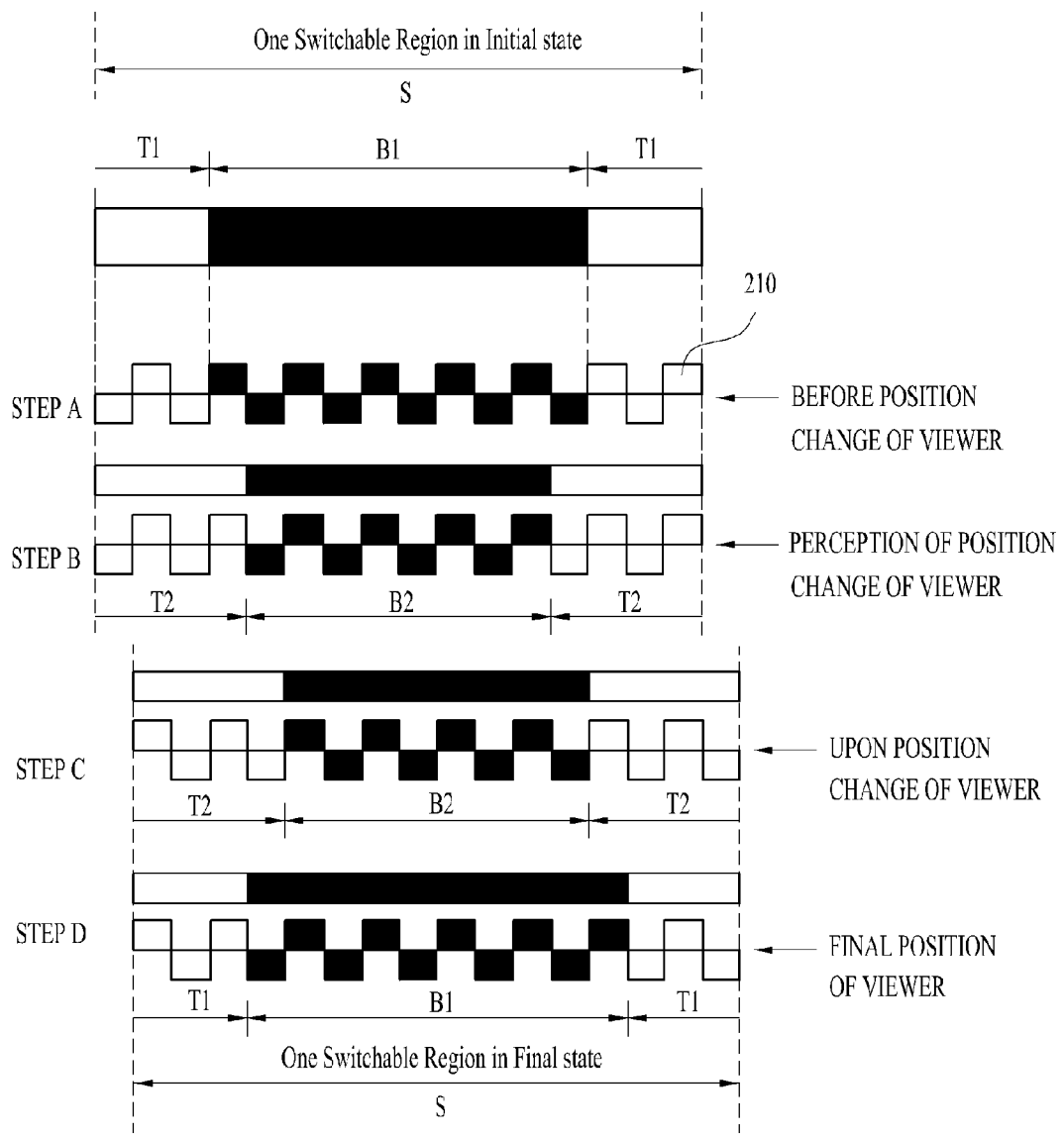
FIG. 5 is a view illustrating an example of adjusting width and position of barrier region depending on position change when position change of the viewer occurs in the stereoscopic image display device according to the present invention.

As shown in FIGS. 1 and 2, the stereoscopic image display device according to the present invention includes a display panel 100 configured to display an image, and a switchable panel 200 formed on the display panel 100. The switchable panel 200 serves to convert the image emitted from the display panel into a 3D image and is divided into a plurality of switchable regions, each switchable region is divided into a barrier region B and a transmitting region T, and the barrier region B and the transmitting region are disposed alternately in the switchable panel 200. That is, there is one transmitting region between two barrier regions and there is one barrier region B between two transmitting regions T in one switchable panel 200. FIG. 1 shows one of the switchable regions in the switchable panel 200, which is configured to include two barrier regions and one transmitting region separating the two barrier regions. However, one switchable region in a switchable panel can be configured to include two transmitting regions T and one barrier region B separating the two transmitting regions, as shown in FIGS. 5 and 6B.

In the switchable panel 200, the same switchable region is repeated, so the transmitting region at adjacent two switchable regions is continued and the barrier regions at adjacent two switchable regions are separated. Herein, each switchable regions has a width 'S.' Also, how many switchable regions a switchable panel can include depends on the size of the stereoscopic image display device.

Each switchable region performs a switching function according to whether or not voltage is applied to the electrodes formed therein. More specifically, the barrier region within each switchable region functions as a barrier to block emitted light from the display panel 100. When no barrier region is formed, the switchable region functions as a single transmitting region that directly emits a 2D image from the display panel 100 below thereof.

The switchable panel 200 includes first substrate 200a and second substrate 200b arranged to face each other, with a liquid crystal layer 230 interposed therebetween. The switchable panel 200 further includes a plurality of lower electrodes 210 formed on the first substrate 200a and an upper electrode 240 formed on the entire surface of the second substrate 200b facing the first substrate 200a. In this case, the plurality of lower electrodes 210, as shown in FIG. 1, may be divided into two groups and the two groups of lower electrodes may be arranged on different layers with an insulating layer 220 interposed therebetween. As occasion demands, the plurality of lower electrodes 210 may be finely divided just into one group and formed on a single layer.

The display panel 100 may be a flat panel display panel, such as a liquid crystal display panel, an organic light emitting display panel, a plasma display panel, a field emission display panel, an electrophoretic display panel, and a quantum dot display panel. In the switchable panel 200 formed on the display panel 100, the plurality of lower electrodes 210 are connected to a voltage applying unit 300, so that liquid crystal molecules of the liquid crystal layer 230 are selectively aligned upon receiving voltages from the voltage applying unit 300.

In particular, if voltage is selectively applied to the plurality of lower electrodes 210, the liquid crystal layer 230 of one switchable region, whose width corresponds to a pitch, is changed into a barrier region and a transmitting region according to the alignment of the liquid crystal molecules in the liquid crystal layer 230. The liquid crystal molecules in the barrier region are aligned to block the light directed from a backlight unit (not shown) to the switchable panel 200 through the display panel 100, whereas the liquid crystal molecules in the transmitting region are aligned to transmit the light.

More specifically, the barrier region and the transmitting region are not actually components of the liquid crystal layer 230, and it looks like a barrier is formed in the liquid crystal layer 230 as light directed from the backlight unit is blocked according to the alignment of the liquid crystal molecules. Accordingly, the switchable panel 200 ensures that the image emitted from the display panel 100 is divided into left image and right image so as to realize a 3D image by using the switching function of the switchable panel. In this way, a viewer can view the 3D image as the left eye perceives only an image for the left eye and the right eye perceives only an image for the right eye.

If the viewer is changing position and hence the viewing angle of the viewer deviates from a particular position, a part of a 2D image, which shall be transmitted through the switchable panel, is blocked by the barrier region, making it is impossible to realize a 3D image. Therefore, it is necessary to sense movement of the viewer and to change a position of the barrier region in order to ensure that the viewer continuously views a 3D image after changing position to a final position and while changing position.

Although not shown, a method, such as user tracking, is implemented to detect movement of the viewer. The user tracking is a method in which a camera, installed to the display panel 100 or the switchable panel 200, or installed to a system including both display panel 100 and switchable panel 200, perceives movement of the pupils of the viewer's eyes or the viewer's head, thereby detecting a final position of the viewer.

When sensing movement of the pupils, if a position of the viewer is changed, the camera detects center positions of the left and right pupils and perceives change of the center positions. Or when sensing movement of the face, if the viewer turns or moves his or her head, the camera perceives movement of the head based on a difference between the face and a background color, thereby detecting a final position of the viewer.

Based on the detected changed position of the viewer, a controller 400 controls a voltage applying unit 300 to supply voltages to the plurality of lower electrodes 210, so that a position of the barrier region within each switchable region is changed according to a sequence of applying voltages to the lower electrodes 210 from the voltage applying unit 300 connected to the controller 400. That is, by perceiving the final position of the viewer who has changed position and changing the sequence of the voltage to be applied to the plurality of lower electrodes 210 based on the viewing angle of the viewer, the barrier region may be moved so as to suit a viewing position of the viewer.

Figure 3:
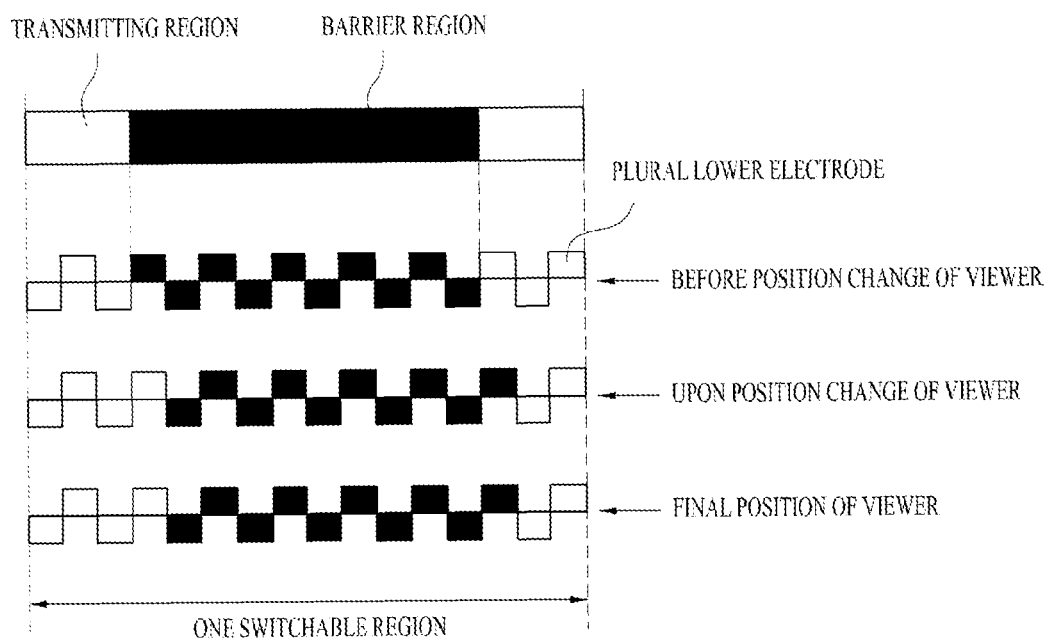
FIG. 3 is a view illustrating an example of moving a barrier region based on position change of a viewer in the stereoscopic image display device of FIG. 1.
Figure 4:
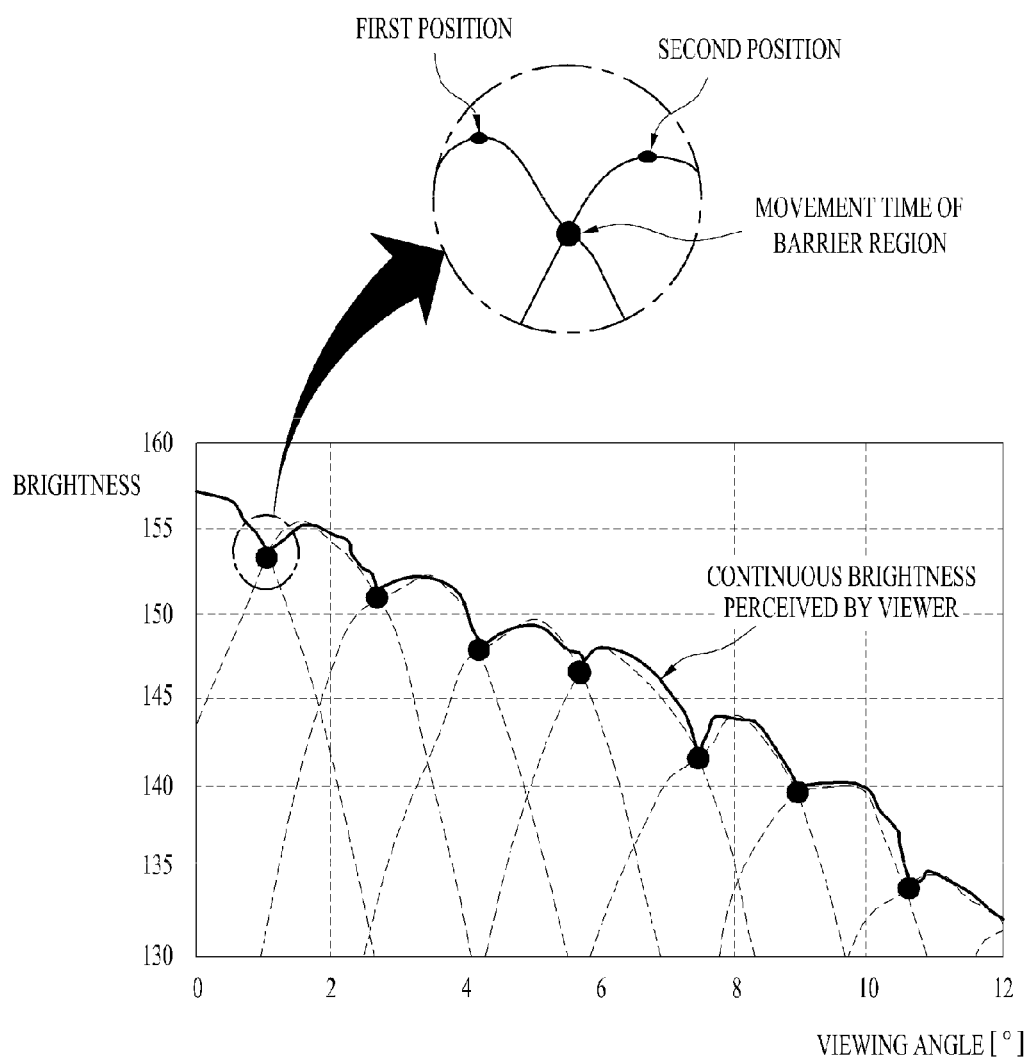
FIG. 4 is a graph illustrating a relationship between brightness and viewing angle when position change of the viewer shown in FIG. 3 occurs.

FIG. 3 is a view illustrating an example of moving the barrier region in the stereoscopic image display device of FIG. 1 based on position change of the viewer, and FIG. 4 is a graph illustrating a relationship between brightness and viewing angle when position change of the viewer shown in FIG. 3 occurs. As shown in FIG. 3, when the viewer stops changing position, "a ratio of the width of the transmitting region to the width of the barrier region within one switchable region having a width of a pitch" (hereinafter referred to as open ratio) is fixedly maintained at about 37%. In the case in which position change of the viewer is perceived, according to the method employed, such as user tracking, the barrier region is moved to follow a changed position of the viewer, so as to change a viewing position. However, when position change of the viewer occurs, for example, as shown in FIG. 4, when the viewer moves in a direction of gradually increasing viewing angle (i.e. when the viewer who is viewing the center of a screen gradually turns his head), brightness is gradually changed as the viewer's position is changed from a first position to a second position.

Generally speaking, the more greatly brightness changes, the more easily can the viewer visually perceive a change of brightness. This visual perception of a change of brightness is referred to as moving flicker. In FIG. 4, the heavy line indicates brightness perceived by the viewer under an observation condition in which viewing angle is gradually increased. In particular, it was experimentally confirmed that the viewer perceives severe moving flicker at a middle position between the first position and the second position because the middle position has great change of brightness in first position and the second position.

Hereinafter, a method for driving a stereoscopic image display device according to the present invention will be described with reference to FIGS. 5-8.

This method is to reduce moving flicker by adjusting a width of the transmitting region when the user is changing position.

Figure 6A:
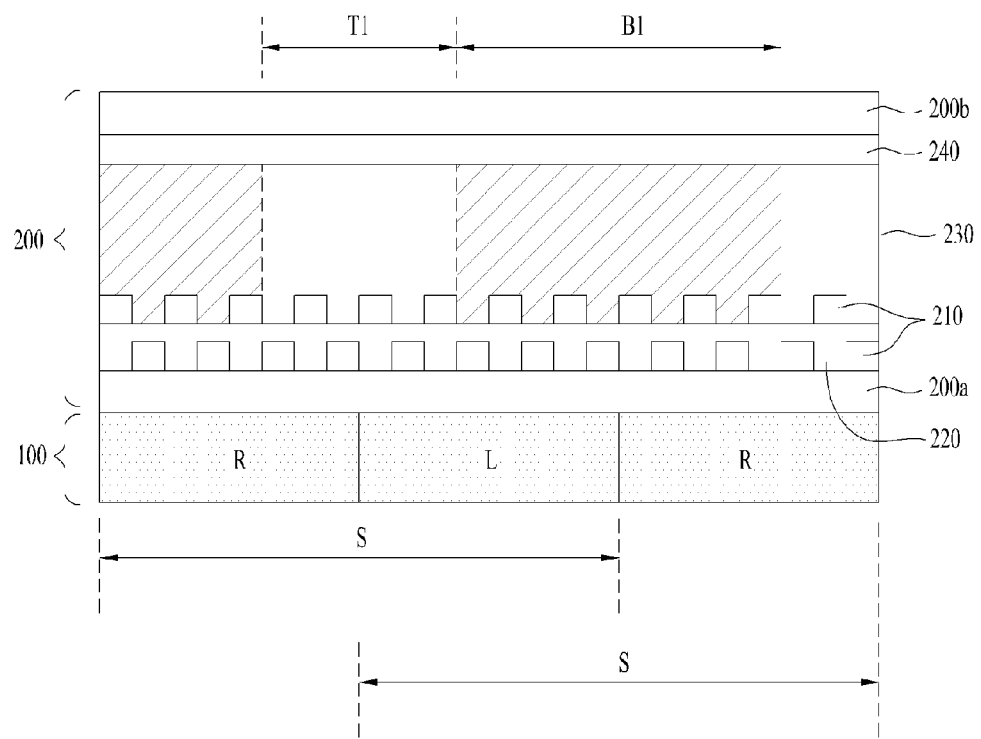
FIGS. 6A and 6B are views illustrating change of widths of barrier and transmitting regions before and after position change of the viewer in the stereoscopic image display device according to the present invention.
Figure 6B:
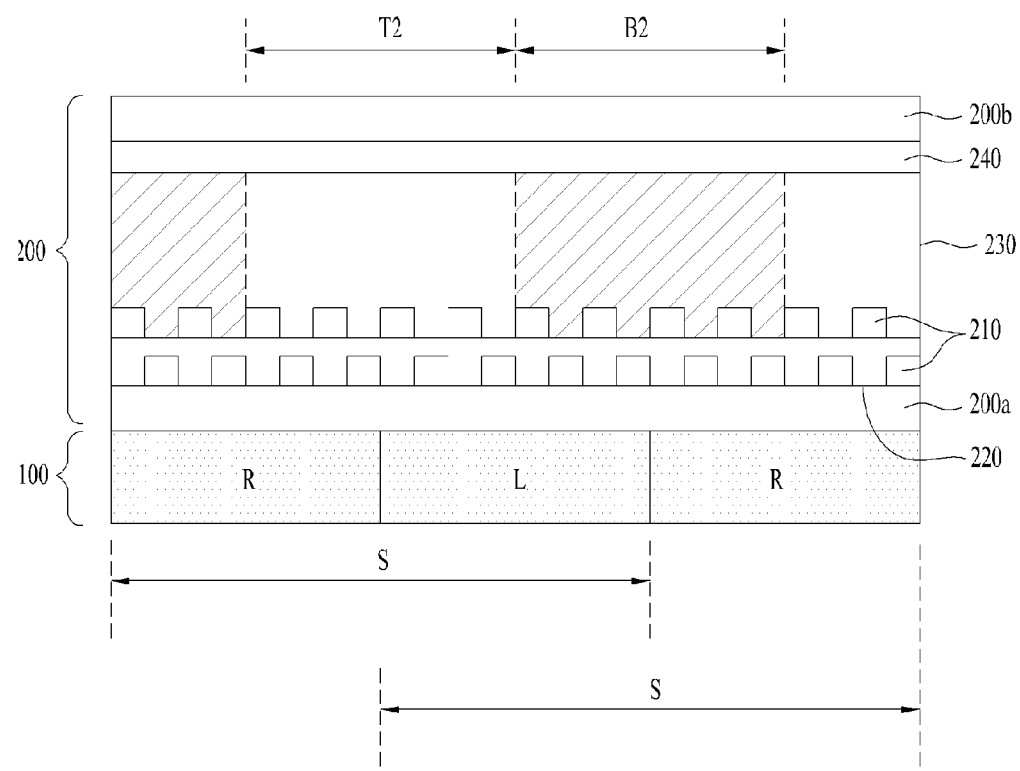
Figure 8:
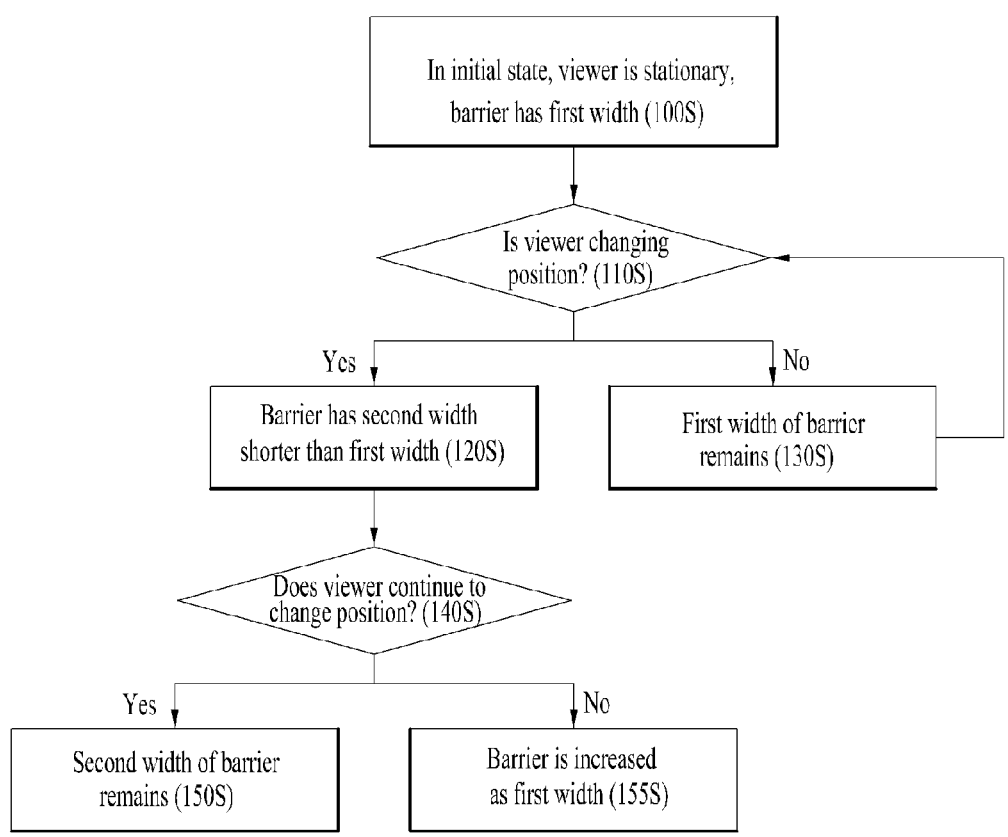
FIG. 8 is a flow chart illustrating a driving method for a stereoscopic image display device according to the present invention.

In the method for driving a stereoscopic image display device according to the present invention, as shown in FIGS. 5, 6A and 8, in an initial state in which the viewer is stationary (in step A), a width of the barrier region of each switchable panel is represented by a first width B1 (100S). In this case, the open ratio is about 37%, that is, T1/S is about 37%. Herein, the width of one switchable region is 'S' and a width 'T1' of transmitting region is 'S-B1'.

Next, a position of the viewer who views the switchable panel is tracked via, e.g., by a user tracking.

In this case, if a fact that the viewer is changing position is detected, the width of the barrier region within each switchable region is changed to a second width B2 (step B of FIG. 5 and FIG. 6B) (120S). If the fact that the viewer is not change position is detected, the width of the barrier region with each switchable region is remained as the first width B1 (130S).

More specifically, if the fact that the viewer is changing position is detected, the controller controls the voltage applying unit to change a sequence of applying voltage to the plurality of lower electrodes 210, so as to increase the width of the transmitting region (from the width T1 to the width T2 and T2>T1). That is, voltage applied to the plurality of lower electrodes 210 provided in switchable lens is classified into barrier region forming voltage and transmitting region forming voltage. In this case, when it is desired to expand the transmitting region, it is necessary to increase the number of the transmitting region forming voltage. In the step B of FIG. 5 illustrates that the open ratio is increased to about 50%, that is, T2/S is 50%. Herein, a width 'T2' of transmitting region is 'S-B2'. The reason for increasing the open ratio as described above is that a brightness reduction degree depending on change of viewing angle is reduced as the open ratio is increased.

Next, it is detected whether the viewer who views the switchable panel continues to change his or her position, by a user tracking (140S).

As shown in step C of FIG. 5, if the viewer continues to change position (in step C), the barrier region is remained to have the reduced second width B2 (150S) and the switchable region is shifted based on position change. That is, the open ratio is maintained as about 50% and the barrier region is shifted to the right as shown in FIG. 5. In this case, shift of the switchable region means shift of the voltage applied to the lower electrodes. Through this shift, the barrier region and the transmitting region are moved together while maintaining the width T2 of the transmitting region in step B. In this case, shift of the voltage applied to the lower electrodes makes that the barrier region having the second width B2 is shifted to correspond to movement of the viewer. As occasion demands, step C may be omitted.

Next, if the viewer stops changing position (in step D), the width of the transmitting region is resumed to the original width (155S). In this case, to detect the viewer stops changing position, user tracking may be used to detect that the viewer has not changed position for more than a period of critical time. For example, assuming that the period of critical time is one second, it is judged that the viewer has reached his or her final position if a fact that the viewer has not changed position for more than one second is detected.

In the stereoscopic image display device of the present invention, the barrier region is shifted with the open ratio being increased (i.e. from the width T1 to the width T2) while the viewer is changing position, and if the viewer has not changed position for more than a period of critical time, the position of the viewer is perceived as a final position and the open ratio is reduced (i.e. from the width T2 to the width T1). In this case, the open ratio corresponding to the final position after position change of the viewer ends is equal to the open ratio (i.e. the width T1) of an initial state before the user changes position.

Here, when the viewer is stationary, the width of the barrier region within each switchable region may be equal to the first width B1. When the viewer is changing position, the width of the barrier region within each switchable region may be equal to the second width B2 that is shorter than the first width B1.

In other words, the method for driving the stereoscopic image display device according to the present invention is characterized in that a width of the transmitting region is increased when the viewer is changing position, so as to reduce a brightness reduction degree depending on change of viewing angle, thereby reducing moving flicker.

Accordingly, in the stereoscopic image display device of the present invention, if a fact that the viewer is changing position is detected, the controller effects control so as to increase the open ratio as compared to a state in which the viewer is stationary, in order to ensure that the viewer can view a high quality 3D image even while changing position.

FIGS. 6A and 6B are views illustrating change of widths of barrier region and transmitting region before and after position change of the viewer in the stereoscopic image display device according to the present invention. In FIGS. 6A and 6B, a switchable region started with 'R (right view)' and a switchable region started with 'L (left view)' are together marked to fully show transmitting region and barrier region.

As shown in FIG. 6A, when the viewer is stationary, the transmitting region within the switchable region maintains the width T1. Then, when position change is detected, the transmitting region is expanded leftward and rightward to the width T2. That is, the expansion of the transmitting region is accomplished with respect to the width T1 of the transmitting region before position change is detected.

Here, the plurality of lower electrodes 210 may be connected respectively to the voltage applying unit 300, so that voltages can be individually applied to the plurality of lower electrodes 210.

More specifically, the plurality of lower electrodes 210 in the switchable panel 200 is connected to the voltage applying unit 300 that is connected to the controller 400. The controller 400 perceives position change and a final position of the viewer, and changes voltages to be applied to the plurality of lower electrodes 210 to ensure that the viewer can view a 3D image at the final position and during changing position. In this case, the controller 400 controls the voltage applying unit 300 to adjust barrier region forming voltage and transmitting region forming voltage to be applied to the plurality of lower electrodes 210 so as to ensure that an open ratio when the viewer is stationary is different from an open ratio when the viewer is changing position. During changing position, the number of applied transmitting region forming voltage is increased and the number of applied barrier region forming voltage is decreased within each switchable region. Further, at the final position after changing position, applying orders of barrier region forming voltage and transmitting region forming voltage may be shifted from the initial applying orders, according to the shift of the switchable region.

Figure 7A:
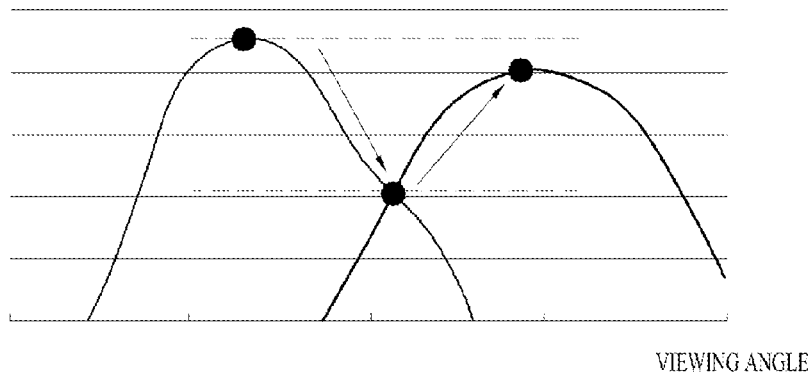
FIGS. 7A and 7B are graphs illustrating change of brightness depending on viewing angle in relation to FIGS. 3 and 5.
Figure 7B:
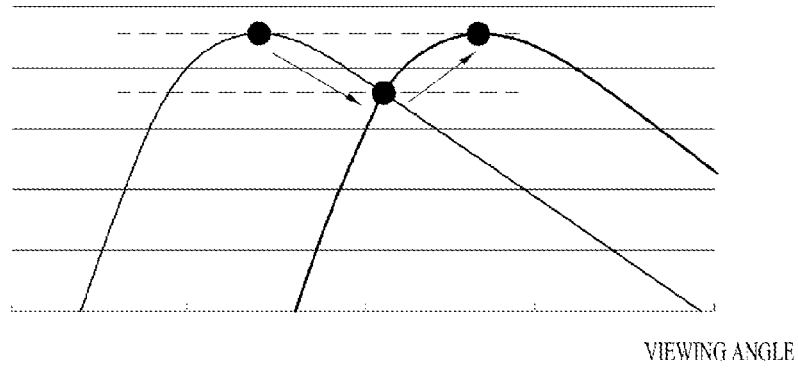

FIGS. 7A and 7B are graphs illustrating change of brightness depending on viewing angle in relation to FIGS. 3 and 5.

In this case, as shown in FIG. 7A, a rapid reduction in brightness occurs at a point where a transmittance curve of a first position and a transmittance curve of a second position meet each other. Thus, a zone where the rapid reduction in brightness occurs is perceived as flicker by the viewer, which results in deterioration in display quality.

However, as shown in FIG. 7B, the stereoscopic image display device of the present invention increases the open ratio when movement of the viewer is detected. That is, when position change of the viewer is detected, the open ratio is increased in order to reduce a brightness reduction degree depending on change of viewing angle by reducing the barrier region and increasing the transmitting region.

Meanwhile, the greater the ratio of the transmitting region to each switchable region, the more 3D crosstalk. That is, 3D crosstalk occurs when a left eye image is introduced into the right eye and a right eye image is introduced into the left eye. 3D crosstalk of 50% means that 50% of the left eye image is introduced into the right eye. An increase in 3D crosstalk deteriorates the image quality in a stereoscopic image display device. Thus, it is preferable that the open ratio is increased to the maximum extent within a range in which 3D crosstalk is 1% or less only when the viewer is changing position.

FIG. 7B illustrates the case in which the open ratio is increased to 50%. It can be seen that a brightness reduction degree between a previous position and a next position is reduced. Thus, even if the viewer views a 3D image while changing position, the viewer can view a high-quality 3D image.

As described above, the stereoscopic image display device according to the present invention is configured to increase the open ratio so as to ensure that the viewer can view a 3D image with minimized brightness reduction while the viewer is changing position. In this way, a brightness reduction degree is reduced, thereby minimizing barrier moving flicker and enhancing display quality.

Meanwhile, in the above description, although the open ratio is described as about 37% when position change does not occur and as 50% when position change occurs, the open ratio is not always limited thereto. The open ratio is changeable according to a pitch of the switchable panel, an electrode interval, and the number of electrodes provided in the switchable panel.

As is apparent from the above description, in the stereoscopic image display device and the method for driving the same according to the present invention, if a viewer is changing position, a barrier region is changed via, e.g., user tracking in such a way as to ensure that the viewer can view a high quality 3D image even the viewer is changing position. Further, it is possible to allow the viewer to less perceive brightness change by increasing an open ratio of a transmitting region to the barrier region within one switchable region. As a result, it is possible to prevent a so-called moving flicker.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
a display panel configured to display an image;
a switchable panel located on the display panel and having a plurality of switchable regions, the switchable panel being configured to convert the image into a 3D image;
a voltage applying unit configured to apply voltage to the switchable panel in such a way as to divide each switchable region into a barrier region and a transmitting region; and
a controller configured to control the voltage applying unit in such a way as to adjust a position of the barrier region and a width of the barrier region within each switchable region,
wherein in case that the viewer has not changed position for more than a period of critical time, the ratio of the transmitting region to each switchable region is reduced.

2. The device according to claim 1, wherein the controller controls the voltage applying unit to change the voltage applied to the switchable panel so as to decrease a width of the barrier region within each switchable region when a viewer is changing position.

3. The device according to claim 2, wherein a ratio of the transmitting region to each switchable region is able to be increased to the maximum extent within a range in which 3D crosstalk is 1% or less.

4. The device according to claim 1, wherein the switchable panel includes first and second substrates arranged to face each other with a liquid crystal layer interposed therebetween, a plurality of lower electrodes formed on the first substrate, and an upper electrode formed on the entire surface of the second substrate.

5. The device according to claim 1, wherein the ratio of the transmitting region to each switchable region is reduced to make the ratio be equal to the original ratio before the viewer changes position.

6. A method for driving a stereoscopic image display device, the stereoscopic image display device comprising a display panel, a switchable panel located on the display panel and having a plurality of switchable regions, and a voltage applying unit to apply voltage to the switchable panel in such a way as to divide each switchable region into a barrier region and a transmitting region, the method comprising:
tracking a position of a viewer who is viewing the stereoscopic image display device;
changing a width of the barrier region within each switchable region in case that the viewer is changing position; and
reducing a ratio of the transmitting region to each switchable region in case that the viewer has not changed position for more than a period of critical time.

7. The method according to claim 6, wherein the step of reducing the ratio of the transmitting region to each switchable region is processed to make the ratio be equal to the original ratio before the viewer changes position.

8. The method according to claim 6, wherein the barrier region of each switchable region has a first width when the viewer is stationary, and has a second width shorter than the first width in case that the viewer is changing position.

9. The method according to claim 8, wherein the step of changing the width of the barrier region includes:
a first step of detecting position change of the viewer;
a second step of changing the width of the barrier region as the second width; and
a third step of shifting the barrier region to correspond to the position change of the viewer.

10. The method according to claim 9, wherein the first step includes detection by using user tracking.

11. The method according to claim 9, wherein the switchable panel includes a first substrate and a second substrate arranged to face each other with a liquid crystal layer interposed therebetween, a plurality of lower electrodes formed on the first substrate, and an upper electrode formed on the entire surface of the second substrate.

12. The method according to claim 11, wherein the second step and the third step include adjusting barrier region forming voltage and transmitting region forming voltage to be applied from the voltage applying unit to the lower electrodes of each switchable region.

13. The method according to claim 12, wherein the second step includes increasing the number of the transmitting region forming voltage applied to the lower electrodes leftward and rightward, so that the number of the transmitting region forming voltage applied to the lower electrodes corresponds to the change of the barrier region from the first width to the second width.

14. The method according to claim 12, wherein the third step includes shifting the barrier region having the second width according to the movement of the viewer, by adjust the barrier region forming voltage to be applied to the lower electrodes.

15. The method according to claim 6, wherein the step of reducing the ratio of the transmitting region to each switchable region further comprises detecting that the viewer has not changed position for more than a period of critical time by the user tracking.

* * * * *